(12) United States Patent
Gisler

(10) Patent No.: US 7,015,314 B2
(45) Date of Patent: Mar. 21, 2006

(54) FORMAZAN REACTIVE DYES

(75) Inventor: Markus Gisler, Rheinfelden (CH)

(73) Assignee: Clariant Finance (BVI) Limited, Tortola (VG)

( * ) Notice: Subject to any disclaimer, the term of this patent is extended or adjusted under 35 U.S.C. 154(b) by 177 days.

(21) Appl. No.: 10/484,564

(22) PCT Filed: Jul. 29, 2002

(86) PCT No.: PCT/IB02/02986

§ 371 (c)(1),
(2), (4) Date: Jan. 22, 2004

(87) PCT Pub. No.: WO03/011979

PCT Pub. Date: Feb. 13, 2003

(65) Prior Publication Data

US 2004/0167321 A1 Aug. 26, 2004

(30) Foreign Application Priority Data

Jul. 31, 2001 (CH) .................................... 1423/01

(51) Int. Cl.
*C09B 56/10* (2006.01)
*C09B 62/245* (2006.01)
*D06P 1/382* (2006.01)
*C09D 11/02* (2006.01)

(52) U.S. Cl. .................... 534/618; 8/549; 106/31.48
(58) Field of Classification Search ................ 534/618; 8/549; 106/31.48
See application file for complete search history.

(56) References Cited

U.S. PATENT DOCUMENTS

| 3,565,881 A * | 2/1971 | Dussy et al. ............. 534/618 |
| 5,491,221 A | 2/1996 | Gisler et al. |
| 5,538,518 A | 7/1996 | Reddig et al. |
| 5,760,215 A | 6/1998 | Gisler et al. |

FOREIGN PATENT DOCUMENTS

| EP | 0526792 | 2/1993 |
| FR | 2000893 | 9/1968 |
| GB | 1245022 | 9/1971 |

OTHER PUBLICATIONS

Lehr, "Synthesis and Application of Reactive Dyes with Heterocyclic Reactive Systems," Dyes and Pigments 14, No. 4, pp. 239-263 (1990).

* cited by examiner

*Primary Examiner*—Fiona T. Powers
(74) *Attorney, Agent, or Firm*—Tod A. Waldrop

(57) ABSTRACT

This invention relates to novel fibre-reactive formazan dyes of the formula (I):

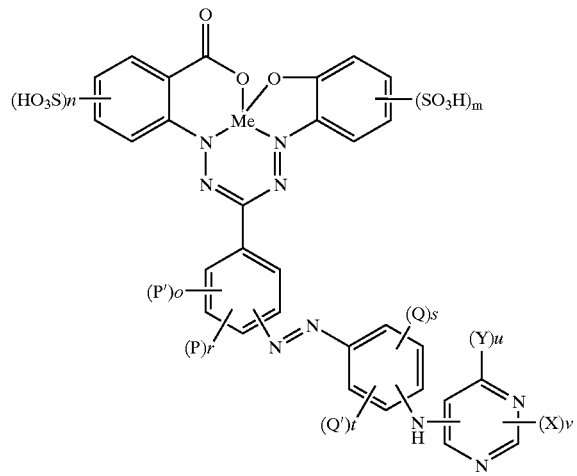

(I)

where the symbols are each as defined in claim 1, their preparation, their use for dyeing and printing hydroxyl-containing or nitrogenous organic substrates and substrates dyed or printed with these compounds.

10 Claims, No Drawings

FORMAZAN REACTIVE DYES

This invention relates to novel fibre-reactive formazan dyes of the formula (I):

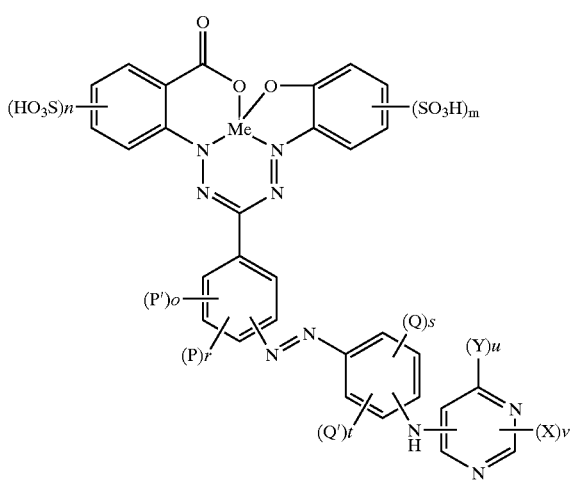

P and P' are independently H, $C_{1-4}$-alkyl, $C_{1-4}$-alkoxy, —$SO_3H$,
Q and Q' are independently H or —$SO_3H$,
Me is Cu or Ni,
X and Y are independently halogen atoms,
m, n, o, r, s and t are independently 0, 1 or 2,
u is 0 or 1,
v is 1 or 2, subject to the proviso that the sum total of u and v is always less than 3, mixtures thereof and also their salts.

In preferred compounds, X and Y are each fluorine, o is 0 or 1, r, s and t are each 0 and both m and n are 1 or 2.

Particularly preferred compounds conform to the formula II

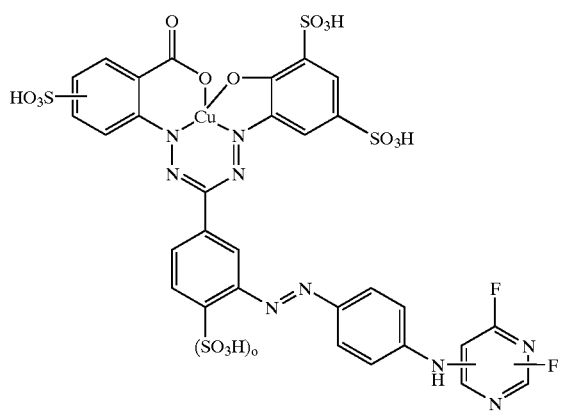

where o is 0 or 1.

The compounds of the formula I and mixtures thereof are reactive dyes; they are useful for dyeing or printing hydroxyl-containing or nitrogenous organic substrates and for use in inkjet printing inks for printing paper and optionally pretreated substrates.

Preferred substrates include leather and fibre materials comprising natural or synthetic polyamides and especially natural or regenerated cellulose, such as cotton, filament viscose or staple viscose. The most preferred substrate is textile material comprising cotton.

The compounds of the formula (I) can be used in dyeing liquors or print pastes according to any dyeing or printing process customary for reactive dyes. Preference is given to dyeing by an exhaust process employing a temperature interval of 30–60° C. and preferably 50–60° C.

The compounds according to the invention can be used as individual dyes or else, on account of their good compatibility, as a combination element with further reactive dyes of the same or other classes that have comparable dyeing properties, for example with regard to general fastnesses, exhaustion value, etc. The combination shades obtained are similar in fastness to the dyeings with individual dye.

The compounds of the formula (I) provide good exhaustion and fixation values. The unfixed portion of dye is readily washed off. The dyeings and prints obtained exhibit good lightfastness. They also have good wetfastness properties, for example with regard to washing, water, seawater and perspiration, and possess good resistance to oxidative influences such as to chlorinated water, hypochlorite bleach, peroxide bleach and also perborate-containing laundry detergents.

This invention also provides the synthesis of the novel compounds.

An amino compound of the formula (III)

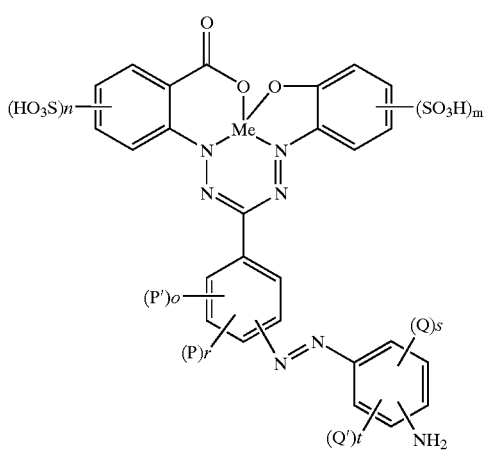

is reacted with 2,4,6-trihalopyrimidine to form the reactive dye of the formula (I).

This invention accordingly further provides a process for dyeing or printing hydroxyl-containing or nitrogenous organic substrates, by dyeing or printing with the above-defined compounds, their salts or mixtures thereof.

The present invention further provides a hydroxyl-containing or nitrogenous organic substrate which has been dyed or printed as per the above-described dyeing or printing process.

The present invention yet further provides substrates, especially cellulose, polyamides and animal fibres, preferably cotton, which have been dyed or printed with such compounds.

Similarly, paper and optionally pretreated substrates which contain cellulose, polyamides or animal fibres and have been printed with inkjet printing inks which contain such compounds, their salts or mixtures.

The examples hereinbelow illustrate the invention. Parts are by weight; temperatures are reported in degrees Celsius.

EXAMPLE 1

32 parts of the azo dye of the formula 1a,

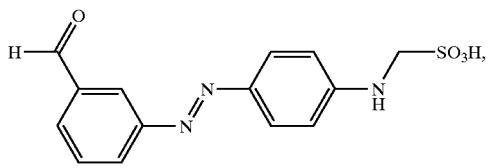

1a prepared by coupling a diazotized 3-aminobenzaldehyde onto aniline ω-methane-sulphonic acid, are initially charged in 250 parts of water. Following addition of 23 parts of the compound of the formula 1b

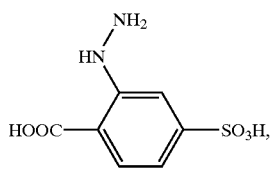

1b during which the pH is maintained between 6–7. Thereafter, 30 parts of sodium acetate and 25 parts of copper sulphate pentahydrate are introduced into the reaction mixture. A diazonium suspension prepared from 27 parts of 2-aminophenol-4,6-disulphonic acid in a conventional manner is used for coupling to the copper formazan system of the formula 1c

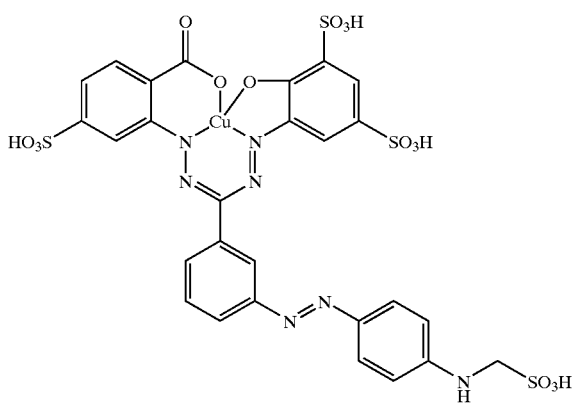

1c

During the addition, the pH of the reaction mixture is maintained between 6 and 8 by metered addition of sodium carbonate. Alkaline hydrolysis of the methylene group and salting out with sodium chloride leave a moist presscake which contains 65 parts of the amino formazan system of the formula 1d

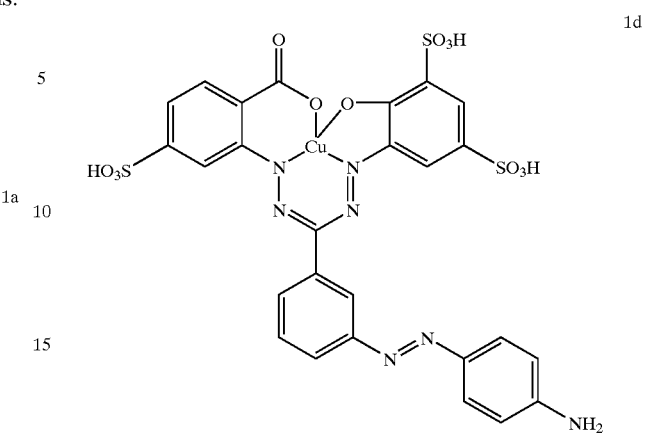

1d

The presscake thus obtained is slurried up in 500 parts of water and heated to 50° C., at which point 14 parts of 2,4,6-trifluoropyrimidine are added over 10 hours. During the addition, the pH is maintained at about 7 using sodium carbonate. The end of the reaction is followed by salting out and filtration. This provides 60 parts of a compound of the formula 1e

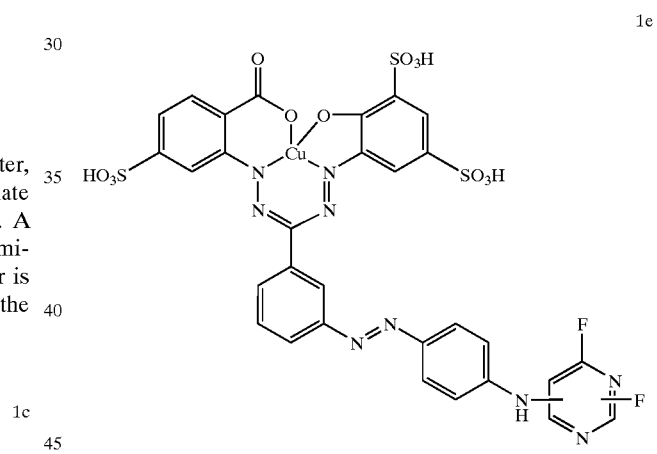

1e in the form of a greenish black salt-containing powder which dyes cotton in vivid bluish green shades.

EXAMPLE 2

The synthesis of Example 1 is repeated, except that the compound 1 b is replaced by the compound of the formula 2b

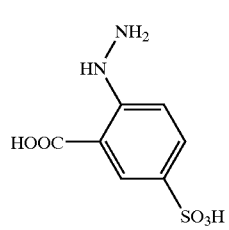

2b to obtain a copper formazan system of the formula 2c

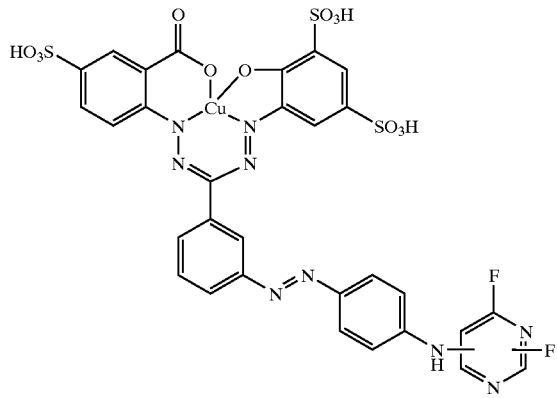

EXAMPLE 3

The synthesis of Example 1 is repeated, except that the monoazo dye of the formula 1a is replaced by 40 parts of the compound of formula 3a

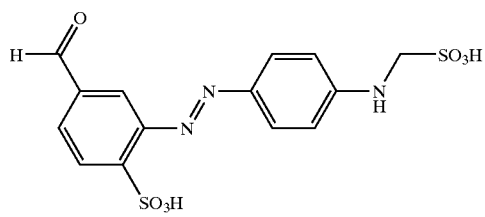

to obtain 69 parts of the dye of the formula 3c

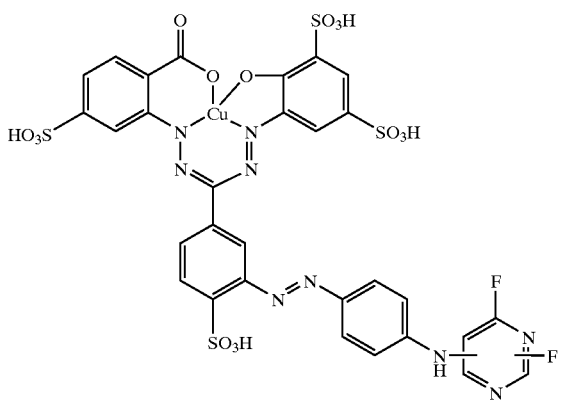

EXAMPLE 4

The synthesis of Example 3 is repeated, except that the compound of the formula 1b is replaced by the compound of the formula 2b to again obtain 69 parts of the copper formazan system of the formula 4c In what follows, possible uses of the dyes described are illustrated.

Use Prescription A

A dyebath containing 0.3 part of the dye of Example 1 and 15 parts of Glauber salt (calcined) in 300 parts of demineralized water is entered with 10 parts of cotton fabric (bleached) at 40° C. After 30 minutes at 40° C., a total of 6 parts of sodium carbonate (calcined) are added at intervals of 10 minutes in portions of 0.2, 0.6, 1.2 and lastly 4 parts while the temperature is maintained at 40° C. Dyeing is then continued at 40° C. for one hour. The dyed material is subsequently rinsed in running cold water and then for 3 minutes in running hot water. The dyeing is washed off at the boil in 500 parts of demineralized water in the presence of 0.25 part of Marseilles soap for 15 minutes. After rinsing in running water (3 minutes hot) the fabric is centrifuged and dried in a drying cabinet at about 70° C. This provides a green cotton dyeing having good fastnesses, which exhibits good light and wetfastnesses in particular and is stable to oxidative influences.

Use Prescription B

A dyebath containing 10 parts of Glauber salt (calcined) in 300 parts of demineralized water is entered with 10 parts of cotton material (bleached). The bath is heated to 40° C. in the course of 10 minutes before 0.5 part of the dye of Example 1 is added. Following a further 30 minutes at 40° C., 3 parts of sodium carbonate (calcined) are added before dyeing is continued at 40° C. for a further 45 minutes.

The dyed material is rinsed with running cold water and then with hot water and washed off at the boil similarly to prescription A. Rinsing and drying leaves a green cotton dyeing which has the properties recited for prescription A.

The dyes of Example 2–4 or dye mixtures of Examples 1–4 can likewise be used for dyeing similarly to prescriptions A and B. The dyeings obtained possess good fastness properties.

Use Prescription C

A print paste composed of 40 parts of the dye of Example 1
100 parts of urea
350 parts of water -continued

| 500 parts of 4% sodium alginate thickening |
| 10 parts of sodium bicarbonate |
| 1 000 parts in total | is applied to cotton material by the customary printing processes.

The printed material is steamed at 102–104° C. for 4–8 minutes and then rinsed cold and hot. The fixed cotton material is subsequently washed off at the boil (similarly to prescription A) and dried. The bluish green print obtained exhibits good general fastnesses.

Examples 2–4 or dye mixtures of Examples 1–4 can likewise be used for printing cotton similarly to prescription C. Bluish green prints having good fastness properties are obtained in all cases.

Use Prescription D 2.5 parts of the dye of Example 1 are dissolved in a mixture of 20 parts of diethylene glycol and 77.5 parts of water at 25° C. with stirring. This solution can be used directly as a printing ink for printing by means of inkjet printing apparatus.

The invention claimed is:

1. Compounds of the formula (I):

(I)

[Chemical structure]

where
P and P' are independently H, $C_{1-4}$-alkyl, $C_{1-4}$-alkoxy, —$SO_3H$,
Q and Q' are independently H or —$SO_3H$,
Me is Cu or Ni,
X and Y are independently halogen atoms,
m, n, o, r, s and t are independently 0, 1 or 2,
u is 0 or 1,
v is 1 or 2, subject to the proviso that the sum total of u and v is always less than 3,
mixtures thereof and also their salts.

2. Compounds according to claim 1, where o is 0 or 1; r, s and t are each 0, both m and n are 1 or 2 and X and Y are each fluorine.

3. Compounds according to claim 1, conforming to the formula (II)

(II)

[Chemical structure]

where o is 0 or 1.

4. Process for preparing compounds according to claim 1, where an amino compound of formula (III)

(III)

[Chemical structure]

is reacted with 2,4,6-trihalopyrimidine to form a compound of the formula (I).

5. A method for dyeing hydroxyl-containing or nitrogenous organic substrates comprising the steps of:
   providing a hydroxyl-containing or nitrogenous organic substrates;
   providing a compound according to claim 1; and
   contacting said hydroxyl-containing or nitrogenous organic substrates with said compound according to claim 1.

6. A method for dyeing cellulose, polyamides and animal fibres according to claim 5 where said hydroxyl-containing or nitrogenous organic substrates are selected from the group consisting of cellulose, polyamides and animal fibres.

7. Inkjet printing inks comprising the compounds claimed in claim 1.

8. Substrates containing cellulose, polyamides or animal fibres and dyed or printed with a compound of the formula (I) according to claim 1.

9. Inkjet printing inks according to claim 7 for printing paper.

10. Inkjet printing inks according to claim 7 for printing cellulose, polyamides and animal fibres.

* * * * *